May 22, 1934.  S. M. GRAY  1,959,785
POLARISCOPE
Filed July 12, 1932   5 Sheets-Sheet 1
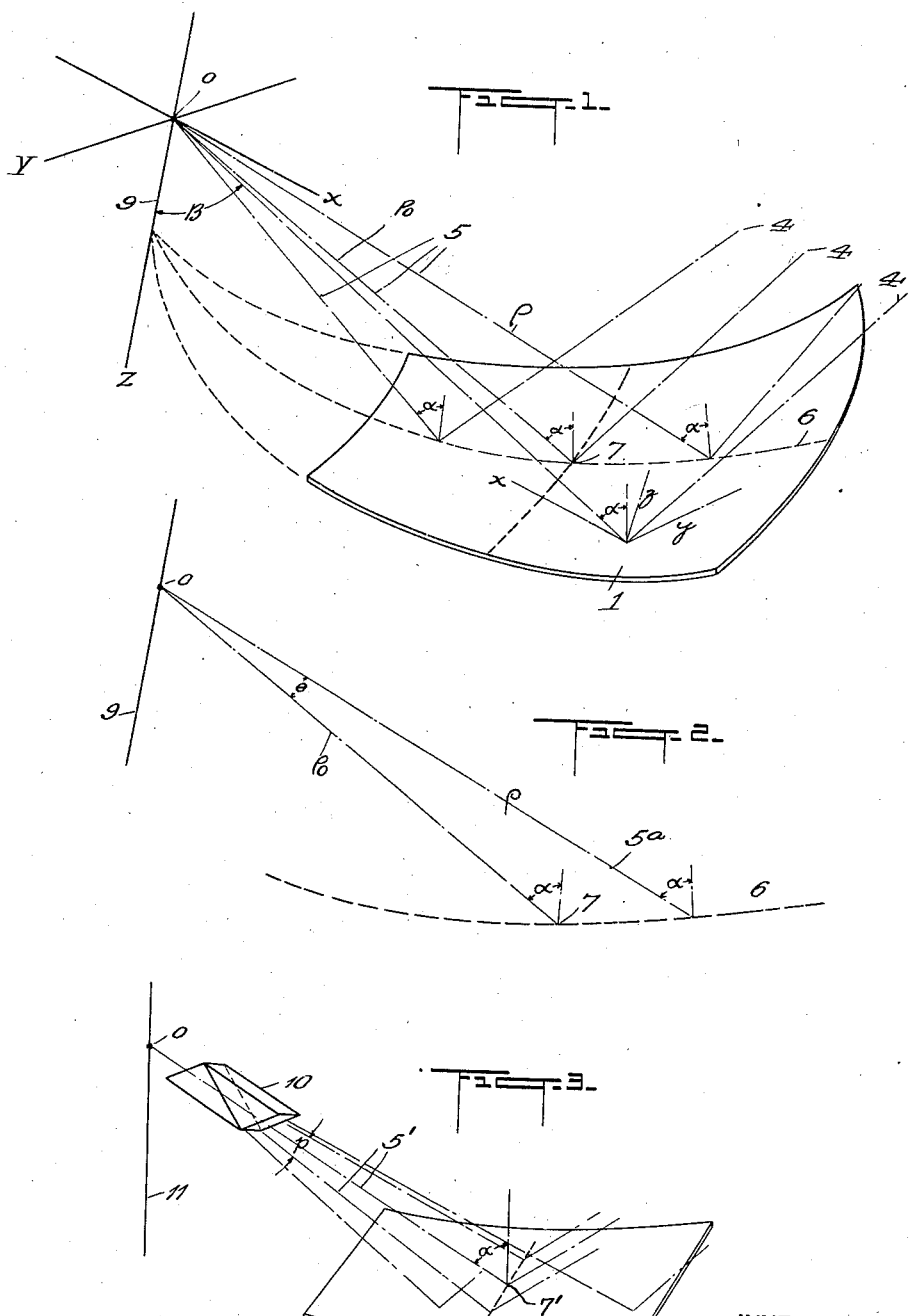

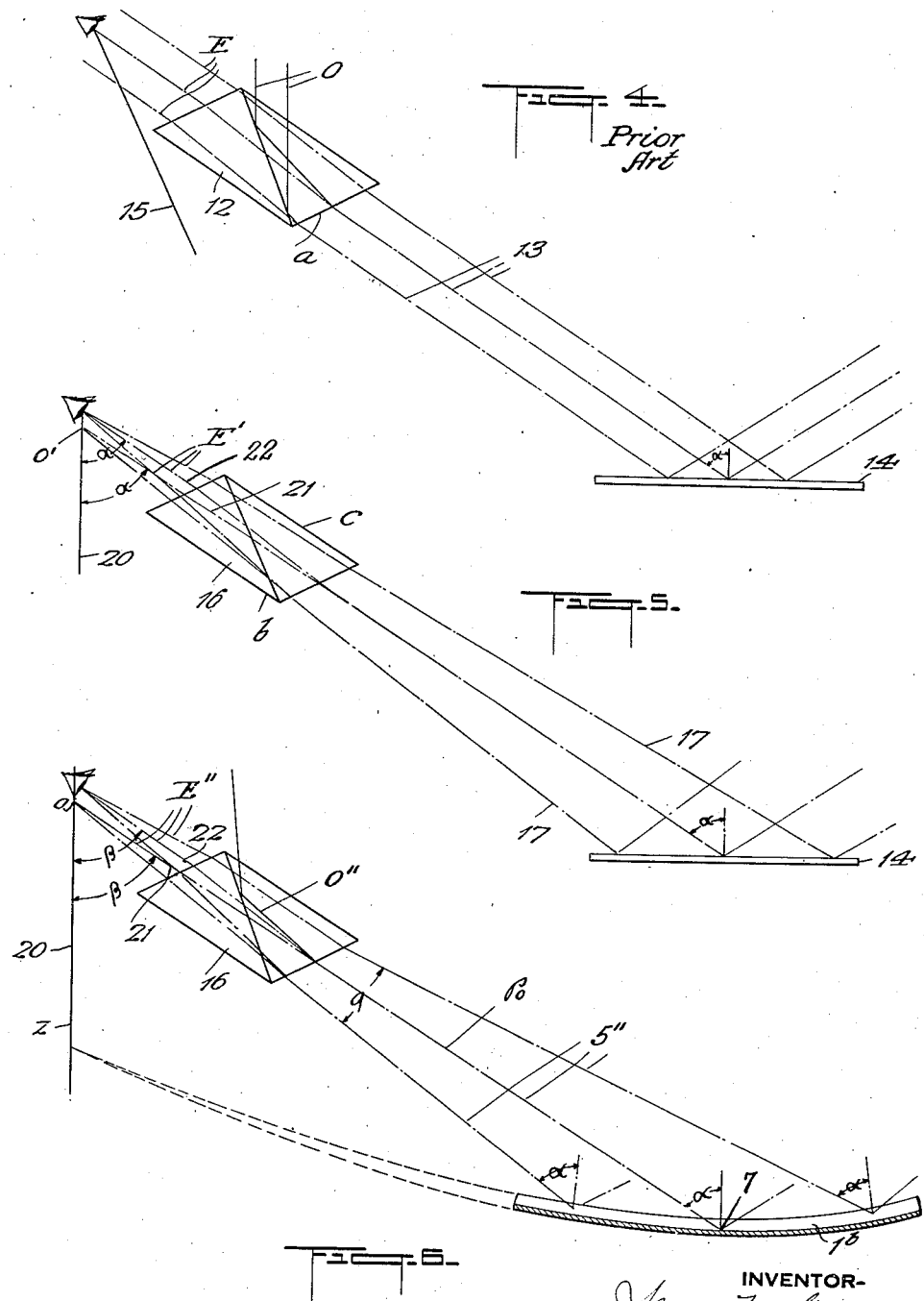

May 22, 1934.  S. M. GRAY  1,959,785
POLARISCOPE
Filed July 12, 1932    5 Sheets-Sheet 3
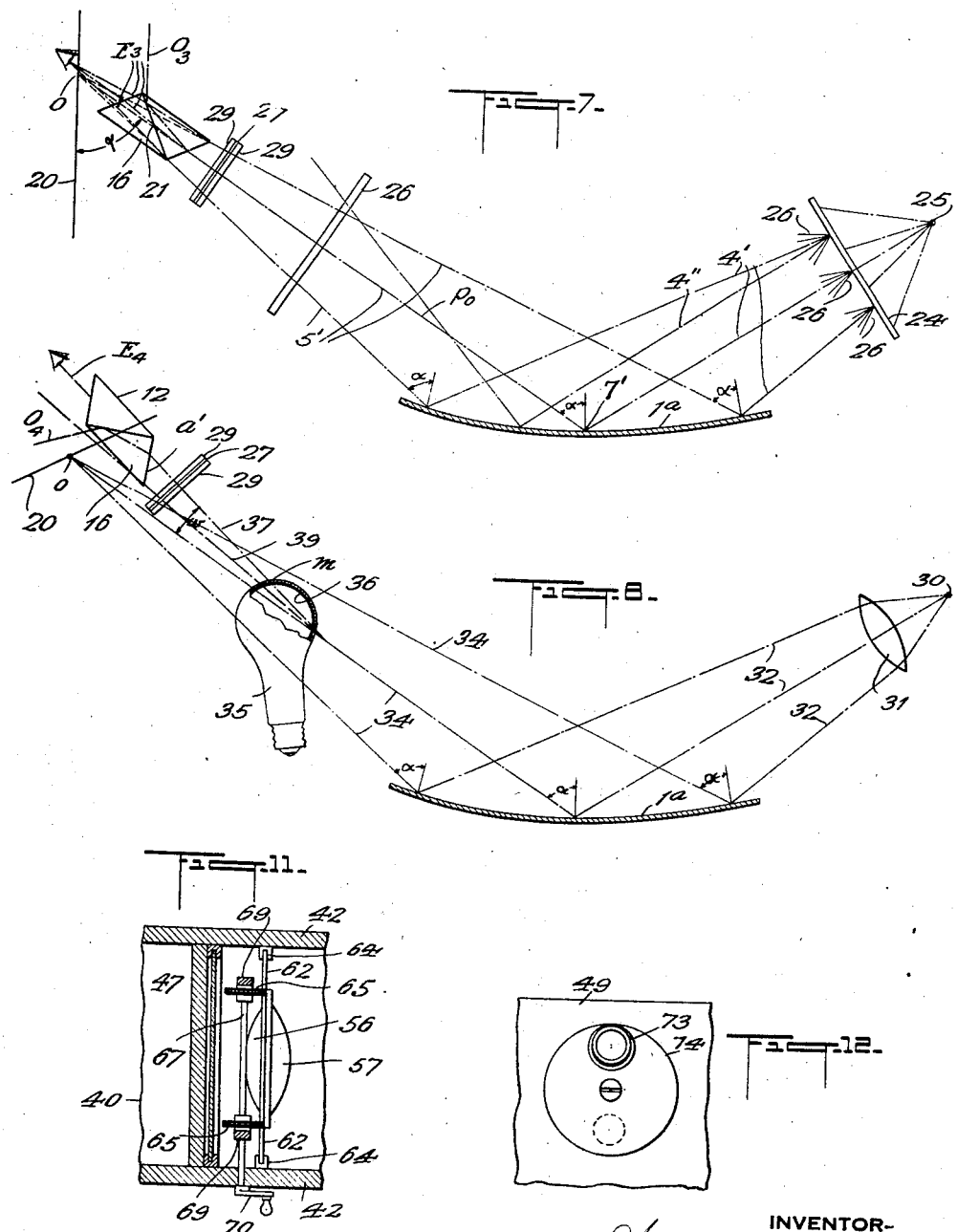

May 22, 1934.　　　　S. M. GRAY　　　　1,959,785
POLARISCOPE
Filed July 12, 1932　　5 Sheets-Sheet 4
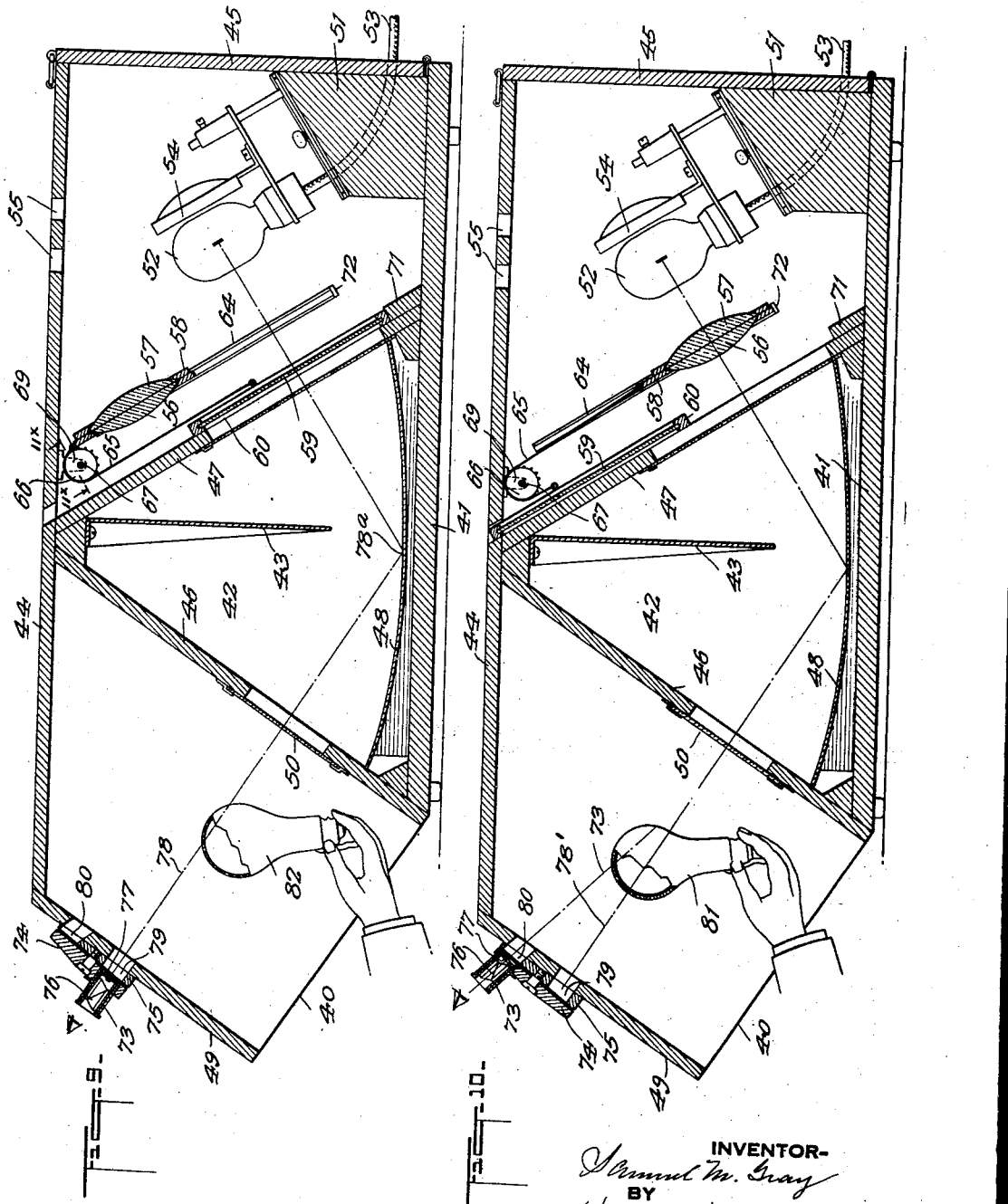

May 22, 1934.                S. M. GRAY                1,959,785
                            POLARISCOPE
                         Filed July 12, 1932        5 Sheets-Sheet 5
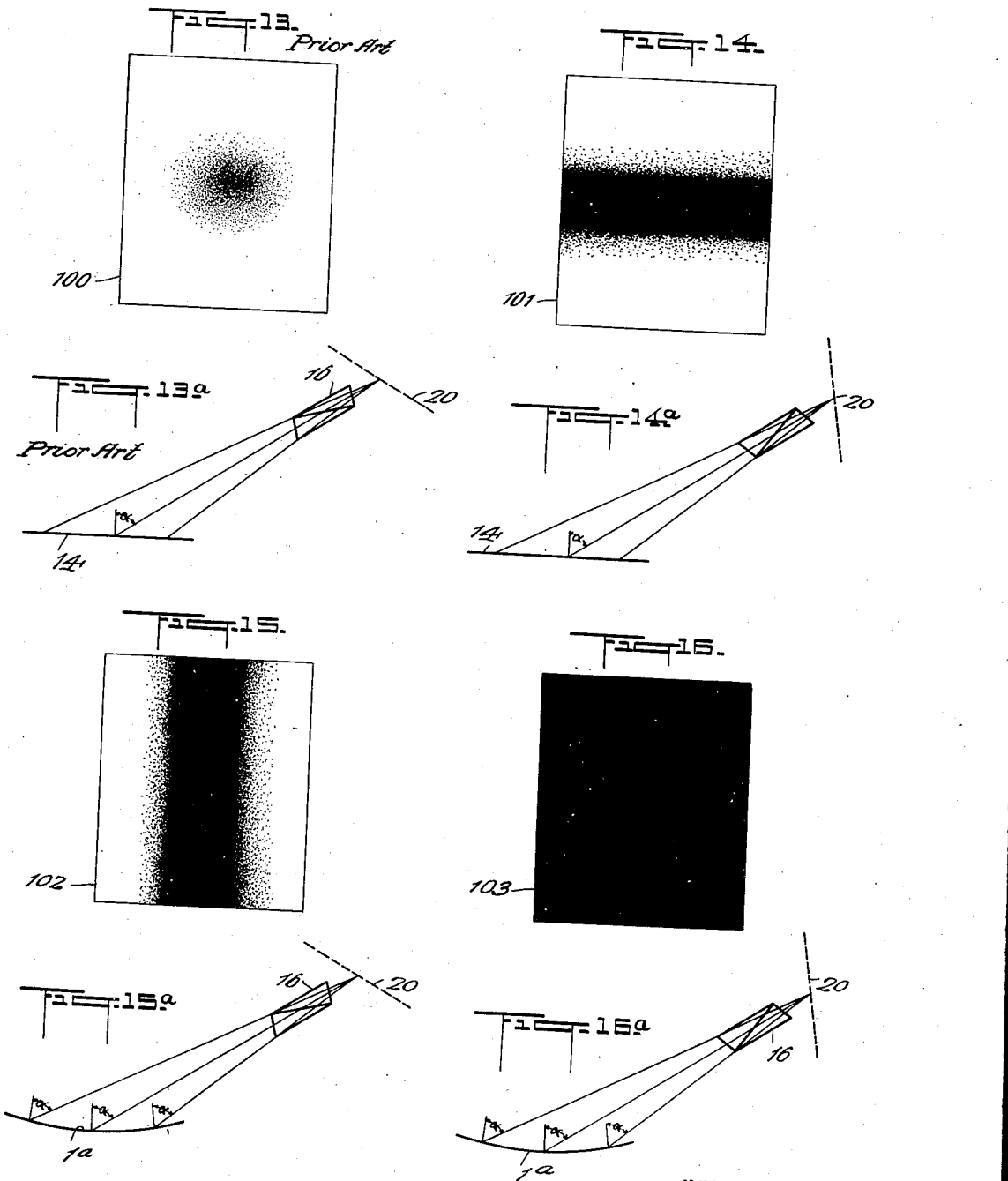

Patented May 22, 1934

1,959,785

UNITED STATES PATENT OFFICE 1,959,785

POLARISCOPE

Samuel M. Gray, Yonkers, N. Y., assignor to Electrical Testing Laboratories, New York, N. Y., a corporation of New York Application July 12, 1932, Serial No. 622,035

18 Claims. (Cl. 88—14)

The present invention relates in general to polariscopes or polarizing instruments utilizing the action of polarized light as a means for analyzing various optical effects, but which find a very useful application in the glass industry for detecting birefringence in glass caused by strains therein. The invention may be utilized in connection with detection of strain in any type of glass, but will be illustrated and described herein in connection with detection of strain by visual examination thereof in either clear or transparent glass, and in glass having adjacent to one of its surfaces a film or coating of a translucent and diffusing character. In the last stated class belongs, for example, frosted glass or clear glass having an irregular surface produced by acid etching or sand blasting, and lightly flashed opal glass or clear glass having on one of its surfaces a flashing of opal glass.

The apparatus which has been generally adopted in the glass industry comprises two polarizers between which the specimen undergoing test is interposed. A diffuser such as a sheet of ground glass or opal glass is utilized between the first polarizer and the light source, which diffuser acts to even up the light in which the specimen is placed. Assuming parallel transmission of rays from the light diffuser, each of said parallel rays is plane-polarized by the first polarizer and without the specimen interposed therebetween, normally prevented from being transmitted through the second polarizer (usually termed the analyzer). With the specimen interposed between the two polarizers, any birefringence or strain causes a change in the character of the light passing through the strained portion of the specimen. In the case of a specimen of transparent glass, the latter may be viewed through the analyzer, and the effect produced by the strain is to illuminate the field locally, giving both the location and an estimate of the magnitude of the strain. In the case of a specimen of a light-diffusing character, the heat effect of the short infra-red rays of the spectrum may be utilized, which rays are capable of being transmitted through either transparent or opaque glasses; thus, the rays, which may pass through the second polarizer, are concentrated on a thermopile connected to a galvanometer which indicates the strain by its deflection.

A reflecting plate is generally used, in polariscopes of the character described, as the first polarizer, in view of its very low cost in comparison to other types of polarizing devices (such as a Nicol prism), particularly if the specimen to undergo study requires a beam of polarized light of large cross-section to issue from the first polarizer. Rays reflected from a surface are plane-polarized with reference to their planes of reflection, i. e. the vibrations of each reflected ray are in a plane which may be conveniently assumed to be perpendicular to the plane in which it is reflected. However, polarization by reflection is only complete for a certain angle of incidence or reflection, this angle being termed the polarizing angle of the reflecting plate and is that angle the tangent of which equals the refractive index of the substance producing the reflecting surface.

I have found that the usual flat plate or usual form of reflecting surface has the disadvantage that the useful rays issuing from such plate or surface for purpose of test are not all reflected at the polarizing angle. Stated in other words, the rays which are utilized for purpose of test are not a parallel beam of light, as heretofore assumed, but a cone of light converging toward a point at the eye or thermopile, and therefore leave such plate or surface at various angles of reflection. This results in incomplete polarization of the reflected light in which the specimen is placed and tested and various degrees of polarization of this reflected light. Consequently, this reflected light is partially, but variably, transmitted past the analyzer, rendering the field or background in which strain is to be detected or visualized non-uniform in its illumination and thus affecting proper detection or distinct visibility of the strain. This non-uniformity of the field is all the more pronounced, or noticeable to the eye (in the case of testing for strain by visual examination of the specimen), when using a light source of high intensity.

An object of the present invention is to eliminate the aforesaid disadvantage of a flat polarizing reflecting surface. More specifically stated, the invention comprehends the provision of a specially curved reflecting surface which, when disposed in proper association with other parts of a polariscope, will cause the reflected rays utilized for purpose of test to leave the surface at a constant angle or substantially constant angle (preferably the polarizing angle).

Another object of the invention is to provide a curved reflecting surface which will not only reflect all useful rays at a constant or substantially constant angle, but which will permit proper positioning of a second polarizer or analyzer (such as a Nicol prism) relatively thereto for extinction or substantial extinction of all useful reflected light incident on said analyzer. To the latter end, I so form my reflecting surface as to cause the planes of polarization of the useful reflected rays (their planes of reflection) to all contain or substantially contain a line common to all of said planes, the vibrations of the useful reflected rays being therefore perpendicular or substantially perpendicular to said line.

In polariscopes a Nicol prism is often used as the analyzer (its polarizing action on light being complete). I have made the important discovery that a Nicol prism, as usually constructed, in general does not cause complete or substantially complete extinction of the useful plane-polarized light (a cone of light converging toward a point at the eye or thermopile) transmitted to it from a reflector, even if the polarization of said transmitted light is substantially perfect. In other words, the planes of reflection or of polarization of the useful reflected rays are not all at right angles respectively to the planes of polarization with reference to which said rays if unpolarized, would be polarized by the Nicol prism; and for this reason alone, light is incorrectly passed by the prism.

Thus, a further object of the present invention is to provide an improved construction of Nicol prism, which, when properly positioned with reference to a reflector or a first polarizer, will cause maximum uniformity of the field in which glass strain is detected or visualized. More specifically stated, the invention aims to provide a Nicol prism so constructed that its optic axis (to be hereinafter defined) is contained or substantially contained in all planes of reflection of the useful rays. As will be hereinafter more particularly described, this construction in general requires that the angle between the geometrical longitudinal axis and the optic axis or the angle between the visual axis (center line of vision) and the optic axis be made equal to the theoretical angle of reflection of the useful rays. If the theoretical angle of reflection is the polarizing angle of the reflector (as is generally the case), then the angle between said axes of the prism becomes equal to the polarizing angle of the reflector.

A still further object of the invention is to provide a reflecting surface as the first polarizer of a polariscope for use in proper association with the aforesaid improved construction of Nicol prism as the second polarizer, which surface will not only reflect all useful rays at a constant angle or substantially constant angle (preferably the polarizing angle), but will cooperate with such Nicol prism in causing maximum extinction of undesirable light. To the latter end, the surface and the prism are so constructed that the planes of reflection of the useful rays are caused to contain or substantially contain the optic axis of the Nicol prism, the vibrations of the useful reflected rays being therefore all perpendicular or substantially perpendicular to the optic axis of the prism. As will be hereinafter more particularly described, in certain cases, as when using a reflecting surface of single curvature, this specified construction of reflecting surface and Nicol prism requires that the angle between the longitudinal geometrical axis and the optic axis of the prism be made equal to the constant or substantially constant angle at which all useful light is reflected from the surface.

The invention thus combines the advantages which may be derived from the specially curved reflecting surface and the advantages which may be derived from the improved construction of Nicol prism. The darkness and uniformity of the field which I may thus obtain by such combination of parts are indeed remarkable.

In my copending application Serial No. 606,851, filed April 22, 1932, I have disclosed and claimed a method for visually examining between two polarizers glass having a light-diffusing coating thereon. This method consists in causing a powerful beam of light to be directly incident to the first polarizer and hence a powerful beam of plane-polarized light to issue from the latter and travel through the specimen including its light-diffusing coating. In this application, I have also disclosed and claimed an apparatus for visually detecting strain in either transparent glass or glass having a light-diffusing film thereon, and, in this apparatus, a powerful source of light is utilized for testing both of said types of glass. The present invention is particularly advantageous when using such a high intensity source, and hence also when utilized in connection with the apparatus disclosed in said application.

The curved reflecting surface of the present invention is of great advantage in apparatus utilizing a diffuser interposed between the light source and the reflecting surface, because the diffuser, although producing a secondary source of light of substantially uniform illumination, acts to redirect in all directions the rays transmitted through it. However, when testing a specimen, having a light-diffusing film thereon, in accordance with the method disclosed in said copending application, the diffuser is omitted (the light-diffusing film on the specimen acting in itself to even up the light in which the strain is visualized); and the curved reflecting surface of the present invention is not strictly essential in so far as the efficiency of a test is concerned, as the usual flat form of polarizing surface may be utilized in conjunction with a condenser lens directing the rays from the light source into a parallel beam of light incident to said flat surface from which the rays are by necessity reflected at a substantially constant angle.

Another object of the present invention is to provide means permitting testing a glass specimen having a light-diffusing coating thereon, in accordance with the method disclosed in said copending application, with the use of the same specially curved reflecting surface as advantageously employed in connection with a light diffuser for carrying out the usual methods of detecting strain in glass. The present invention thus makes possible the use of the improved reflecting surface in an apparatus, such as disclosed in my application, permitting detection of strain in either a transparent specimen or a specimen having a light-diffusing film thereon, a single reflecting surface being therefore utilized in said apparatus for carrying out either one of said tests.

My invention will be clearly understood from the following description taken in connection with the accompanying drawings, in which Fig. 1 is a perspective view of my curved reflector, illustrating the manner in which it is formed; Fig. 2 illustrates its linear curve in one plane or reflection; Fig. 3 is a perspective view of another reflector, having a single curvature in parallel planes, and of a Nicol prism associated therewith; Fig. 4 illustrates the prior conception of parallel transmission of rays from a flat reflector through a Nicol prism; Fig. 5 shows my improved form of Nicol prism in cooperative relationship with a flat reflector; Fig. 6 shows my improved constructions of reflector and Nicol prism in cooperative relationship with one another; Fig. 7 is a schematic illustration of a complete apparatus for visually examining strain in a transparent glass specimen; Fig. 8 is also a schematic illustration of said apparatus altered for visually detecting strain in glass having a light-diffusing coating in accordance with the method disclosed in my copending application Serial No. 606,851; Fig. 9 is a vertical cross-sectional view through the central plane of an apparatus, embodying my improved reflecting surface and improved form of Nicol prism embodied therein, said apparatus being shown adapted for the testing of transparent electric lamp bulbs; Fig. 10 is a view similar to Fig. 9, with the apparatus shown adapted for the testing of electric lamp bulbs having a light-diffusing film or frosted surface; Fig. 11 is a reduced fragmentary cross-sectional view of the apparatus taken on the plane indicated by the line 11$^x$—11$^x$ of Fig. 9; Fig. 12 is a fragmentary front view of the apparatus, showing the rotatable disc having the analyzer mounted therein; Figs. 13, 14, 15 and 16 are reproductions of actual photographs of the effects on the field of light obtained with four different combinations of reflector and Nicol prism; and Figs. 13$a$, 14$a$, 15$a$, and 16$a$ are simplified diagrams of said combinations respectively.

In accordance with my invention, I utilize a reflecting surface which is so disposed and curved with reference to a predetermined fixed point as to cause all rays proceeding from the surface and converging to said point to be reflected from the surface at a constant angle, or substantially constant angle, preferably the polarizing angle of the substance producing such reflecting surface (or the angle the tangent of which is equal to the refractive index of said substance). In Fig. 1, the reflecting surface (indicated by the numeral 1) is shown as curving lengthwise and crosswise, i. e. in directions transverse to one another. The fixed point is indicated by the numeral 0. The incident rays, such as 4, may be considered as proceeding from an imaginary source of illumination, and the reflected rays, such as 5, converge to and meet at the point 0. The curvature of the surface 1 is such that all rays proceeding to the point 0 leave the surface at a constant angle $\alpha$, and in this respect it is immaterial if the source of light transmits rays to the surface 1 in directions other than those of the rays 4, as no ray can be reflected from the surface 1 and proceed to the point 0 at any other angle than said constant angle $\alpha$. This will be more clearly understood in connection with the description of the apparatus shown in Fig. 7.

It can be shown that the linear curve of the reflector 1 in any one of the planes of reflection (each containing the point 0 and each being perpendicular to the reflecting surface) or its curved line of intersection with any one of said planes, for example its intersection, indicated by the dotted line 6, with the central plane of reflection (see Fig. 2 in which said central plane is assumed to coincide with the plane of the drawing), is a portion of a logarithmic spiral and is determined by the following equation:

$$\log_e \frac{\rho}{\rho_0} = \theta \tan \alpha \qquad (I),$$

in which $\alpha$ is a constant and is equal to the desired angle (preferably the polarizing angle) at which all rays proceeding to the point 0 are to be reflected from the surface; $\rho_0$ is also a constant and is equal to the predetermined length of a predetermined reflected ray 5 in the plane of reflection in which the curve of the surface is to be determined (such as the distance of the predetermined point 7 on the curve 6 in the central plane of reflection from the predetermined point 0); $\rho$ and $\theta$ are mutual variables, values of which are dependent upon one another, and may be defined, respectively, as the length of any reflected ray in the same plane of reflection in which said predetermined reflected ray is located and the algebraic value of the angle in radians which it makes with said predetermined reflected ray. In Figs. 1 and 2, $\theta$ is negative for angles on the left of the ray of length $\rho_0$ and positive for angles on the right of the ray of length $\rho_0$. The length $\rho_0$ is determined by the requirements of the apparatus in which the reflecting surface is to be used. The values of $\rho$ and $\theta$ are determined by assigning values to one of these two variables in the equation and calculating the corresponding values of the other from said equation.

It should be observed that $\rho_0$ may apply to the predetermined length of any predetermined ray in the plane of reflection in which the curve of the surface is to be determined. For example, assuming that, in Fig. 2, $\rho_0$ would be chosen as the particular length of the ray 5$a$ (and the variable angle $\theta$ measured from said ray 5$a$) the identical curve 6 would be obtained from the above equation. However, in designing the curved surface for use in proper association with other parts of a polariscope, it will be found convenient to assign a predetermined length $\rho_0$ to the central reflected ray or the center ray of the cone of reflected light proceeding to the point 0. Evidently, there will be a reflected ray of length $\rho_0$ in each plane of reflection.

It will now be seen that there are an infinite number of surfaces, all different in their curvature in directions transverse to the planes of reflection, which will satisfy the requirement that all rays 5 be reflected at a constant angle. If the curve 6 be rotated about any line or axis 9 passing through the point 0 and contained in the plane of said curve (the plane of the drawing in Fig. 2), it will generate a surface of revolution obviously reflecting all rays reaching the point 0 at the constant angle $\alpha$. There is a separate surface of revolution for each line or axis that can be passed through the point 0 in the plane of the curve 6, there being consequently an infinite number of surfaces of revolution or reflecting surfaces which will cause rays proceeding by reflection to the point 0 to be reflected at the constant angle $\alpha$.

Evidently, that reflecting surface or surface of revolution is chosen which is best suited to meet the requirements of the apparatus in which it is to be used, or the type of objects to be tested. In Fig. 1, the surface 1 is that obtained by revolving the linear curve 6 about the axis 9. It is shown to taper along its length, although it is understood that it may be shortened or extended in either length or width to cover any area suitable for producing the proper volume of reflected light or to meet the requirements of the apparatus in which it is to be used.

Calling the point 0 the origin of a three-dimensional system of coordinates, Z the axis of said system coinciding with the axis of revolution, and X and Y the other two perpendicular axes passing through said origin, it can be shown that the curved surface 1 is determined by the following equation:

$$\log_e \frac{\sqrt{x^2+y^2+z^2}}{\rho_0} = \tan \alpha \left[ \tan^{-1} \frac{\sqrt{x^2+y^2}}{z} - \beta \right] \quad (II).$$

Here, $\rho_0$ is also a constant and the predetermined length of a predetermined reflected ray 5. $\beta$ is a constant and the angle between said predetermined ray of length $\rho_0$ and the Z axis. There are three mutual variables $x$, $y$ and $z$, which are the three coordinates of any point on the reflecting surface. In other words, $x$ is the coordinate of such point parallel to the X axis or its perpendicular distance from the plane determined by the axes Y and Z; $y$ is the coordinate of such point parallel to the Y axis or its perpendicular distance from the plane determined by the axes X and Z; and $z$ is the coordinate of such point parallel to the Z axis or its perpendicular distance from the plane determined by the axes X and Y.

The selection of the predetermined ray is of course arbitrary, but it will be found convenient to assign a predetermined length $\rho_0$ to the center ray of the reflected beam. It will also be found convenient to draw the X axis in the plane of said center ray.

By making $\tan \alpha$ (in the two equations given above) equal the refractive index of the material producing the reflecting surface, the reflected rays 5 are then all completely plane-polarized. If black porcelain enameled sheet metal is used as such material, the angle $\alpha$ causing complete polarization is 56 degrees and 40 minutes.

From the above description it is clear that if the eye (or a thermo-pile) be placed at 0 and a specimen (not shown in Fig. 1) be disposed in the path of the cone of light rays 5, such specimen will be subjected to a uniform field of plane-polarized light, i. e. the rays 5 of this uniform and plane-polarized light acting on such specimen are the only rays or the useful rays that may travel toward the fixed point 0 for purpose of test.

It is observed that, for any one of the curved reflecting surfaces or surfaces of revolution which may be obtained in the manner described, the planes of reflection or of polarization of the useful reflected rays (proceeding to the point 0) all contain a mutual line which is the line of intersection of said planes, as well as the axis of revolution. Observing that the vibrations of a ray polarized by reflection are perpendicular to its plane of reflection, the vibrations of all useful rays reflected from any surface of revolution are therefore perpendicular to said line. For example, in Fig. 1 the planes of polarization of the rays 5 all contain the axis Z and the vibrations of said rays 5 are all perpendicular to said axis Z. This fact, as has been demonstrated in practice and as will be more clearly understood hereinafter, permits maximum extinction of the useful reflected rays by an analyzer properly positioned in their path.

I have found that in practice it is in general sufficient to use a reflecting surface $1a$ (see Fig. 3) of cylindrical character or with a curvature only along its length. In other words, the reflecting surface may be caused to curve only in parallel planes, the curved lines of intersection of the surface with such parallel planes being all the same and determined by the first equation given above having reference to the linear curve in a single plane of reflection. With a field of light of the width employed in the usual type of polariscope, a slight variation in the angle of reflection across the width of the reflecting surface causes no perceptible non-uniformity of brightness or of sensitivity of the apparatus. For example, when utilizing a Nicol prism 10 (Fig. 3) as the analyzer in the path of the useful rays 5' reflected from such a surface (converging toward the point 0), the width of the field at the reflecting surface $1a$ is restricted by the lateral aperture of the prism (or the angle $p$ between the extreme rays, in a lateral plane, of the cone of light which the prism is capable of passing to the point 0). Thus, at the extreme lateral edges of the field visible through the Nicol prism, the angle of reflection differs from the theoretical angle of reflection by less than 1 degree. This deviation results in a depolarization of the reflected light to the extent of only about one-tenth of one percent. The curvature of the surface $1a$ in the longitudinal direction is however an important feature of the invention, for the depolarization at the extreme upper and lower edges of the field suffered by light reflected from a plane surface, such as has been formerly used, amounts to about twenty percent. It is also observed that there is a line which is substantially contained in each of the planes of reflection or of polarization of the useful rays 5'. This line, indicated by the numeral 11, passes through the point 0 and is perpendicular to the plane tangent to the surface $1a$ at the point 7' from which the central reflected ray 5' proceeds. It can be shown that the line 11 is the line having the least average angular deviation from the planes of reflection of the useful rays 5'. It is contained in the planes of reflection coinciding with the central longitudinal plane and deviates but very slightly from anyone of the remaining planes of reflection. As will be hereinafter more clearly understood, the fact that such a line 11, is substantially common to each of the planes of reflection of the rays utilized for purpose of test, permits maximum extinction of said rays by an analyzer constructed in accordance with this invention and properly positioned in their path.

A Nicol prism is constructed from an elongated rhombohedron of Iceland spar cut into two parts along a certain plane, which parts are cemented together by Canada balsam. Iceland spar is a double-refracting crystal, i. e. it gives rise under certain conditions to two refracted rays when a single light ray is incident thereto. One of these two refracted rays is called the ordinary ray and the other the extraordinary ray, and the two rays are plane-polarized in planes at right angles to one another respectively. The prism acts to intercept all ordinary rays by total reflection from the Canada balsam, but (assuming the incident beam to be unpolarized) to permit all extraordinary rays to travel from one end face to the other.

In Fig. 4, a Nicol prism 12 (such as has been employed heretofore) is shown positioned in the path of a parallel beam of light rays 13 reflected from a flat reflector 14 (such as has been employed heretofore) at the polarizing angle thereof. The ordinary rays O, produced by refraction of the rays 13 incident to the end face $a$ of the prism, are lost by total reflection. For certain positions of the prism 12, the extraordinary rays E, also produced by refraction of the incident rays 13, are allowed to pass and reach the eye. It should be noted that the extraordinary rays E (assuming them to be transmitted) are all plane-polarized at right angles to each principal plane of the crystal taken with reference to its end face a. A principal plane of a crystal with reference to one of its end faces may be defined as a plane perpendicular to that face and containing the optic axis of the crystal. Any plane parallel to such a plane may also be termed a principal plane. The optic axis of a crystal is the direction in which a ray of unpolarized light can proceed without double refraction or in which polarized light can travel without having its polarization disturbed. Any line drawn parallel to this direction is oriented similarly and may represent the optic axis. Iceland spar is a uni-axial crystal, i. e. it has only one direction in which a ray of ordinary light may travel without bifurcation. Thus, if the prism 12 be turned about the central ray of the reflected beam until its central principal plane with reference to its end face a coincides with the central plane of reflection (the plane of the drawings), the planes of polarization with reference to which the prism 12 would polarize the extraordinary rays E (assumed transmitted for the moment) are respectively perpendicular to the planes of polarization (the planes of reflection) with reference to which the rays 13 are polarized. For this position of the prism 12, it is set to reject all polarized light rays 13 that the reflector 14 sends forward, i. e. the parallel rays E are completely extinguished. The optic axis of the crystal 12 (being a direction by definition) is necessarily contained in each of the parallel planes of reflection for total extinction of the rays E and is generally indicated by the line 15. However, it is to be particularly noted that, for a parallel transmission of rays (as in Fig. 4), it is not required that the optic axis 15 assume a particular direction in the planes of reflection, i. e. the parallel rays 13 are completely extinguished by the prism 12, for many positions of the line 15 relative to the direction of said rays 13 or to the longitudinal geometrical axis of the prism 12. It is understood, however, that the usual construction of prism requires that the optic axis be not contained in the visual axis, i. e. deviate appreciably from the visual axis, in order that the prism function properly.

Heretofore the only requirement which has been considered essential for complete extinction of rays in a polariscope utilizing a reflector as the first polarizer and a Nicol prism as the analyzer is that the principle planes of the prism with reference to its end face a coincide with the planes of reflection, assumption being made that the reflected light is theoretically parallel. As a matter of fact, in the usual type of polariscope the reflected rays proceeding toward the eye (or thermopile) for purpose of test are not parallel, but the field which is actually visualized or in which a specimen is actually tested is formed by a cone of light converging toward a point at the eye (or thermopile). Therefore, as I have determined, extraordinary rays, produced by a large portion of the rays of this cone of light, are normally transmitted past the analyzer, with the result that said field is not one of complete darkness, nor of uniform intensity. One reason, as has already been already noted, is that the rays of this cone of light are not reflected at the polarizing angle and not all completely polarized. I believe that another important reason, however, is that the planes of polarization provided by reflector and prism are not perpendicular for all rays of this cone of light, because the optic axis of the prism, as heretofore constructed (Fig. 4), may assume any one of many directions relative to its longitudinal geometrical axis.

I have made the important discovery that, by so constructing the parts of a Nicol prism that its optic axis is contained in each of the planes of reflection of the rays of the aforesaid converging beam of reflected light, such prism will cause maximum darkness of the field, as seen by the observer. Thus, in Fig. 5, such a prism 16 is shown properly positioned in the path of the cone of light rays 17 reflected from the flat reflector 14, with the central principal plane thereof coinciding with the central plane of reflection (the plane of the drawings). The optic axis is represented by the line 20, and, since contained in all planes of reflection of the rays 17, is evidently perpendicular to the plane surface 14. (The optic axis is only for convenience shown passing through the point 0' toward which the reflected rays 17 converge; it being a direction by definition, it may be represented by any line parallel to the line 20.) The longitudinal geometrical axis (parallel to the longitudinal faces b and c) is indicated by the numeral 21. The visual axis is indicated by the numeral 22. Here, said axes 20 and 21 make an angle $\alpha$ with one another equal to the polarizing angle of the reflector 14. Said axes 20 and 22 also make an angle $\alpha$ with one another equal to the polarizing angle of the reflector 14. As I have determined, there is caused a maximum extinction of the rays E' converging to the eye. I believe that the reason for the results which I thus obtain is that the planes of polarization provided by reflector and prism are perpendicular for each of the reflected rays 17, except for the slight deviation produced by refraction of said rays when entering the prism 16. This will be more clearly understood hereinafter.

An important feature of my invention resides in the particular surface of revolution of the polarizing reflector, which I employ in connection with the improved construction of Nicol prism. The reflector and the prism are so constructed that the axis of the revolution of the reflecting surface and the optic axis of the prism as represented by the line passing through the point 0 toward which the useful reflected rays converge, are made to coincide with one another. Obviously, for each differently constructed Nicol prism, there is only one surface of revolution which will fulfill this requirement. Calling $\rho_0$ the predetermined length of the center reflected ray (coinciding with the longitudinal geometrical axis of the prism), its curvature is given by Equation II, in which $\beta$ is the angle between the optic axis and the longitudinal geometrical axis of the prism (also the angle between the optic axis and the visual axis of the prism). For a Nicol prism so constructed that the angle between its optic axis and its longitudinal geometrical axis is made to equal the constant angle of reflection of the useful rays, the equation becomes (calling $\rho_0$ the predetermined length of the center reflected ray producing the center line of vision):

$$\log_e \frac{\sqrt{x^2+y^2+z^2}}{\rho_0} = \tan \alpha \left[ \tan^{-1} \frac{\sqrt{x^2+y^2}}{z} - \alpha \right] \text{(III)},$$

where $\alpha$ is the constant angle of reflection (preferably the polarizing angle) and also the angle between said center reflected ray and the optic axis.

In Fig. 6, a cross-sectional view of this reflecting surface (indicated by the numeral 1b)

is shown through its central longitudinal plane. Its axis of revolution Z coincides with the optic axis of the prism 16, as represented by the line 20 passing through the point 0 toward which the reflected rays 5'' converge. The prism 16 is positioned in the path of the rays 5'', with the central principal plane thereof coinciding with the central plane of reflection. The rays 5'' are all reflected at the constant angle $\alpha$. For the particular prism 16 utilized, the angle $\beta$ between the optic axis 20 (or the axis of revolution Z) and the visual axis 22 and also the angle $\beta$ between the optic axis 20 (or the axis of revolution Z) and the longitudinal geometrical axis 21 are equal to the constant angle of reflection $\alpha$. In this case the optic axis 20 is evidently parallel to the normal to the surface 1b at the point 7 from which the central ray of length $\rho_0$ proceeds.

I have found that such a combination of reflector 1b and Nicol prism 16 produces complete darkness of the field (as seen by the eye), i. e. complete extinction of the extraordinary rays E'' shown in Fig. 6 as converging to the eye. I believe the cause of this remarkable effect on the field to be that the planes of polarization provided by reflector and prism for each useful ray advancing toward the eye are almost perpendicular to one another. My reasons for this are the following: The plane of polarization of the ordinary ray produced by refraction of a ray of light incident to a uni-axial double-refracting crystal contains the direction of such refracted ray and the optic axis of such crystal, the vibrations of such refracted ray being consequently perpendicular to its direction and to said plane of polarization. Therefore, assuming that the ordinary rays O'' (one only being shown), when in the prism and prior to reflection from the Canada balsam separating the two parts of the prism, are respectively contained in the planes of reflection of the rays 5'' (this assumption is very nearly true as will be seen), it at once becomes apparent that the respective planes of polarization of the rays O'' (when in the prism and prior to reflection from the Canada balsam) all contain the optic axis 20. It follows that the planes of polarization of the reflected rays 5'' (their planes of reflection) coincide respectively with the planes of polarization of the corresponding ordinary rays O'' (when in the prism and prior to reflection from the Canada balsam). Consequently, it is logical to assume that, since the extraordinary rays E'' (if transmitted) are plane-polarized at right angles respectively to the corresponding ordinary rays O'', the planes of polarization of the extraordinary rays E'' (when in the prism) are respectively perpendicular to the planes of polarization of the corresponding reflected rays 5''. Complete extinction of the extraordinary rays E'' thus occurs. This complete darkness of the field may also be explained by observing that the vibrations of both the reflected rays 5'' and the refracted rays O'' are perpendicular to the optic axis 20 (again assuming that the ordinary rays O'' are contained in the planes of reflection of the rays 5''). Thus, the prism 16 is set to transmit by ordinary refraction all vibrations of the incident rays 5'', i. e. the ether vibrations of the rays 5'' are all dissipated in the ordinary rays O''. No extraordinary rays E'' is thus permitted to pass to the eye. Again this extinction of the extraordinary rays E'' may be explained by observing that the vibrations of these rays E'', if transmitted, would be executed respectively in planes containing the optic axis 20 of the crystal and the directions of the rays E''. The reflected rays 5'' have substantially no component vibrations in said planes respectively. Extinction of the rays E'' necessarily follows.

That the assumption of coincidence of the refracted rays (when in the prism) with the planes of reflection is very nearly true may be understood by first observing that the vertical aperture of a Nicol prism (the angle $q$ in Fig. 6) is in general not in excess of 25 degrees and the lateral aperture of a Nicol prism (the angle $p$ in Fig. 3) is in general not in excess of 20 degrees. The vertical and lateral apertures of a Nicol prism are restricted by the requirement that the Canada balsam must totally reflect the ordinary refracted rays and must not totally reflect the extraordinary refracted rays. If these apertures are much in excess of the values given, then the Canada balsam totally reflects the extraordinary rays or may permit the ordinary rays to pass, the prism being thus rendered useless. For the apertures given, the deviation of the actual plane of polarization of the extreme oblique refracted ray O'' (the ray having both extreme vertical and lateral deflections from the visual axis) from the desirable plane of polarization (the plane of reflection of the ray 5'' giving rise to such oblique rays O'') is less than 1 degree (when such oblique ray O'' is in the prism and prior to its reflection from the Canada balsam). The intensity of the corresponding oblique extraordinary ray E'' which is by necessity transmitted is proportional to the square of the tangent of this minute angle of deviation and is therefore very slight and not noticeable to the eye, even when it originates from a light source of high intensity.

Reverting back to the discussion of the results obtained by the arrangement of parts shown in Fig. 6, it now may be concluded that the planes of polarization provided by reflector 1b and prism 16 are perpendicular to one another for each of the rays of the useful field of light advancing toward the eye, except for the slight error produced by refraction of such light when entering the prism. This theory appears to also explain the results obtained by the arrangement of parts shown in Fig. 5, as it is observed that the planes of reflection of the useful rays 17 all contain the optic axis 20 perpendicular to the flat reflecting surface 19.

I have found that, due to the relatively small width of the field visible through a Nicol prism, a reflecting surface 1a curving only along its length, as has already been described (Fig. 3), can be employed in conjunction with the improved construction of Nicol prism and still cooperate therewith in producing a field of substantially total darkness, as seen by the observer. Here, however, as will be hereinafter more particularly described, in order to satisfy the requirement that the optic axis of the prism be contained substantially in all of the planes of reflection of the useful rays (converging toward the eye), the improved construction of Nicol prism necessitates that its optic axis make an angle with its longitudinal geometrical axis (or with its visual axis) equal to the substantially constant angle of reflection of said useful rays. Such an arrangement of reflector and Nicol prism is illustrated in Fig. 7, which also shows in simplified manner a complete apparatus for detecting strain in transparent glass by visual examination thereof. This apparatus will now be described as illustrating the invention in both its general and specific aspects.

Referring to Fig. 7, the reflecting polarizer 1a receives light rays from the light diffuser 24, such as a sheet of flashed opal glass, illuminated by the light source 25. All rays 4' proceeding by reflection from the surface 1a toward the fixed point 0 are reflected substantially at the constant angle α or at the polarizing angle of said surface, i. e. all reflected rays 5' converging toward the point 0 in the plane of the drawings leave the surface exactly at the polarizing angle thereof, and all reflected rays 5' converging toward the point 0 in planes other than the plane of the drawings leave the surface very nearly at the polarizing angle thereof. Preferably, the light source 25 is disposed on the axis of the beam of incident rays 4' or central incident ray, and the diffuser 24 disposed perpendicularly to said axis. It is to be noted that the rays from the light source are redirected in all directions when passing through the diffuser 24, as indicated by the cones of light 26 proceeding from the same points from which the rays 4' proceed. However, the only possible rays which may travel after reflection toward the point 0, are all reflected at substantially the polarizing angle α. Thus, the cone of reflected light 5' converging toward the point 0 for purpose of test (as will be presently understood) on the transparent glass specimen 26 interposed in its path is substantially uniform and substantially completely plane-polarized. Rays, such as 4'', which are reflected from the surface 1a at angles other than the polarizing angle α, and which do not form part of the aforesaid cone of light, are of no consequence in their effect produced on the field of light in which the specimen 26 is disposed or in the effect produced on same by the specimen 26, as such rays are not used for purpose of test.

The Nicol prism 16 is placed in the path of the reflected rays 5', with its central principal plane coinciding with the central plane of reflection (the plane of the drawings). Now the prism 16 is so constructed that the angle between its optic axis 20 and its geometrical longitudinal axis 21 is made equal to the theoretical angle of reflection α, its optic axis being thus perpendicular to the tangent to the surface 1a at the point 7' from which the central reflected ray of length ρ0 proceeds. As already stated in connection with the description of Fig. 3, such a perpendicular line 20, passing through the point 0, is the line of least average deviation from the planes of reflection of the useful rays 5'. For the angular apertures p and q of Nicol prism usually employed, the maximum angular deviation, i. e. the angle between the line 20 and the plane of reflection of the ray having both extreme vertical and lateral deflections from the central reflected ray, is not very much greater than one degree. Consequently, by so constructing the Nicol prism 16 that the angle between its optic and visual axis is made to equal the substantially constant angle of reflection α, its optic axis is caused to be substantially contained in all planes of reflection of the useful rays 5', and the analyzer 16 is therefore set to reject substantially all polarized light that the polarizer 1a sends forward (assuming the specimen 26 removed), i. e. the cone of extraordinary rays E₃ are normally almost completely prevented from being transmitted through the analyzer 16 to the eye. It is to be noted that the line 20 in Fig. 7 cannot be taken as a line of intersection of the planes of reflection, as in Figs. 5 and 6. The planes of reflection produced by the single curve 1b do not meet at a single line, but each pair of planes intersect at a different line. Thus, in Fig. 7, an infinite number of lines of intersection are present, some of which depart considerably in direction from the line 20.

Strained glass is birefringent, i. e. it acts as a double-refracting crystal under the influence of light. Thus, a strain in the specimen causes a change in the character of those rays 5' which have travelled through said strain. This change is generally believed to be a transformation of the plane-polarized light leaving the first polarizer into elliptically-polarized light. The result is that rays E₃ are transmitted to the eye and the field is therefore illuminated locally, the illuminated portions of the field corresponding to strained portions of the glass. The field in which the strain appears is remarkably dark and uniform, and the location and magnitude of strain (by its degree of illumination) are made distinctly observable. This darkness and uniformity of field and accurate detection of strain may be obtained with a source 25 of any desired degree of intensity, which has heretofore not been possible.

I prefer to interpose a tint-producing element 27 in the path of the rays to the analyzer. This element 27 may consist of a thin crystalline plate or disc of a double-refracting crystal, such as selenite, with its principal planes set at 45 degrees to the central plane of reflection. This thin crystal 27 may be conveniently held between two plates or discs 29 of unstrained optically plane transparent glass. It acts to effect elliptic polarization of the plane-polarized rays incident thereto, due to the fact that the ordinary and extraordinary components produced by the splitting up of the plane-polarized rays, which components (substantially coinciding) have their respective planes of vibration at right angles to one another, are unequally retarded, i. e. their velocities are different, when passing through the crystalline plate. The elliptically-polarized rays emerging from the crystalline plate 27 give rise to two sets of rays when entering the Nicol prism. One set, the ordinary rays O₃, are extinguished by total reflection, as previously explained, and the other set, the extraordinary rays E₃, are transmitted to the eye. These transmitted rays are made up of components of both ordinary and extraordinary rays produced by the crystalline plate 27, these components being out of phase with each other due to the retardation of one relative to the other in transmission through the selenite plate. This phase difference varies with the wave-length of the light. Consequently when white light is used as the source 25, the relative intensities of its component colors are changed when travelling through the Nicol prism, and therefore the transmitted rays E₃ will have a prevailing tint depending on the thickness of the plate. When using selenite, the field which is usually caused to be produced is a purplish color. If now a specimen of strained glass be introduced, it will have the effect of changing the phase difference of the superimposed ordinary and extraordinary rays transmitted through the plate 27, with the result that the strain appears in colors contrasting with that of the field. The quality of the field, obtained by my improved constructions of reflector and prism, as to its uniformity of illumination, is in no way changed by the use of the tint-producing element 27.

In Fig. 8, the curved reflecting surface 1a is utilized in an apparatus for visually detecting strain in glass having a light-diffusing coating thereon in accordance with the method disclosed in my aforesaid copending application Ser. No. 606,851. The powerful source of light 30 which is required by said method is so disposed on the principal axis of a lens system 31 (between the latter and its principal focus) that a divergent beam of light rays 32 is produced, each of which rays is incident to the reflecting surface 1a substantially at a constant angle or the polarizing angle α of said surface. Thus, all incident rays must by necessity be reflected substantially at the polarizing angle, and the beam of light produced by the reflected rays 34 is substantially uniform and substantially completely plane-polarized. The single-curve-surface 1a causes the reflected rays 34 to travel toward a narrow and elongated zone of light, of relatively small cross-section, passing through the point 0 and transverse to the plane of the drawing. It is evident that a reflecting surface curving along both its length and width may likewise be utilized. Such a double-curve reflecting surface would cause the rays reflected therefrom to travel substantially to a point or substantially circular zone of light of relatively small cross-section.

The specimen shown under observation is an electric lamp bulb 35 interiorly frosted at 36, and is disposed in the path of the beam of light 34. In view of the intensity of the reflected rays 34, the specimen is preferably viewed through the analyzer 16 at an angle with the path of these rays, so that none of the latter are incident to the analyzer and none therefore conducted to the eye. As will be more clearly understood hereinafter, a clear determination of any strain is made possible (without danger to the eye) by reason of the intense illumination of the specimen. Thus, indirect rays, such as the ray 37, travel from the specimen and impinge on the end face a' of the prism 16. The latter, as before, gives rise to two sets of refracted rays, one set, the ordinary rays such as O₄, being intercepted by total reflection from the Canada balsam. In the position of the prism 16 shown in Fig. 8, it has been rotated 180 degrees about the axis 39 of the solid angle ω from its position of Fig. 7. Therefore, its central principal plane with reference to its end face a' again coincides with the plane of the drawings, with the result that the other set of refracted rays, the extraordinary rays such as E₄, are to a large extent normally prevented from reaching the eye, the field (assuming the specimen 35 removed) appearing substantially dark. It is observed that the angular relationship between the optic and visual axes of the prism 16 is no longer the same as in Fig. 7, a field being nevertheless produced of sufficient darkness to enable strain in the specimen 35 to be positively determined. In so far as I am presently aware, when carrying out the method of detecting strain in light-diffusing specimen now being described, the field of light visible through the Nicol prism is not affected by the relative position of optic and visual axes, as when testing glass for strain in accordance with the usual methods of detection.

The intensity of the light 30 permits reflected rays 34 to travel through both rear and front walls of the light diffusing bulb 35, so that the entire surface thereof is brilliantly illuminated. Since the specimen is disposed in the substantially uniform and substantially completely plane-polarized beam of light rays 34, the indirect rays, such as 37, proceeding to the analyzer, are substantially plane-polarized (except when acted upon by a strain in the glass) and of uniform intensity. Therefore, observing that the film 36 on the specimen 35 acts in itself to diffuse light transmitted through it, the field in which the strain appears is uniform and both location and magnitude of strain are made distinctly observable. As in Fig. 7, the tint-producing element 27 and its supporting plates 29 may be interposed between the specimen and the analyzer 16.

It should be noted that there are two portions of the bulb 35 located on the line of vision 37, so that there are actually two portions under observation at any time. Thus, the bulb 35 is manipulated into various positions to make sure that a single strain is visualized at one time and not two superimposed strains which might appear to the eye as a single strain. In general, however, a single strain appears, which strain is in the end portion m of the bulb whereon the usual manufacturer's stamp (including his trademark and the rated voltage and wattage of the lamp) is located. Comparatively severe strains may be produced in said portion of the glass bulb by reason of the particular process used for its marking. In Fig. 8, said end portion m is shown under observation. The bulb 35 is shown interiorly frosted, although bulbs having an outside film of a light-diffusing character may be similarly tested.

The apparatus shown in Figs. 9 to 12 inclusive is adapted to the testing of either transparent electric lamp bulbs or bulbs having a light-diffusing coating, and is essentially the same apparatus as that disclosed in my aforesaid copending application Serial No. 606,851, except that the curved reflecting surface of the present invention is utilized as the first polarizer and the optical system of lenses required for a test on a light-diffusing bulb is adapted to be so disposed relatively to the light source and to said surface as to produce a divergent beam of light, as heretofore explained, incident to said surface substantially at its polarizing angle. This apparatus is designed to permit it to be quickly altered to suit the particular test desired. It comprises an enclosing casing 40 having a base 41, side walls 42 (one being shown in Figs. 9 and 10 and the two in Fig. 11), a top plate 44, and a rear end cover 45. The latter is preferably hinged to the base 41 to provide access into the rear end portion of the casing. Two partitions 46 and 47 are inclined to one another and to the base 41, which partitions are each provided with an opening through which light may be transmitted. Each of said walls 42 has a front edge portion parallel to the partition 46 and to which a front plate 49 is secured. The partitions 46 and 47 and the front plate 39 divide the casing into three compartments, the front compartment of which is open at its bottom to permit insertion of the specimen and its manipulation in the path of the light rays transmitted from the light source 52 in the rear compartment and reflected from the curved polarizer 48 in the middle compartment. In the embodiment of the invention shown, the reflector 48 consists of a black porcelain enameled sheet metal, and the angle of the partitions 46 and 47 with the base 41 is preferably made equal to 56 degrees and 40 minutes, the polarizing angle of said reflecting surface. The reflector 48 curves only along its length, although it may be made to also curve along its width. It is fixed to the base 41 in any appropriate manner, and accumulation of dust particles thereon is prevented by closing the opening in the partition 46 by a transparent plate of unstrained glass 50. A plate 43 may be suspended from the top of the casing in the middle compartment to intercept unnecessary rays. The light-transmitting apparatus located in the rear compartment is adjustably mounted on an inclined block 51 and comprises a lamp of high intensity, such as a 400 watt projection lamp, to which current is supplied by the cable 53, and a concave reflecting mirror 54, both the lamp and the reflector being adjustable in perpendicular directions relatively to the fixed block 51. A plurality of ventilation openings 55 may be formed through the top plate 44 of the casing.

When testing transparent electric lamp bulbs, a light diffuser 59 is utilized for the purpose of providing a uniformly bright background. This diffuser may consist of a sheet of flashed opal glass held at its edges in a suitable frame 60, and, when positioned for a test on a transparent bulb, covers the opening formed through the partition 47 (as shown in Fig. 9). When testing bulbs having a light-diffusing coating, this diffuser is removed and an optical device, which may consist of a pair of plano-convex lenses 56 and 57 held by a casing 58 in proper alinement and with their flat faces disposed against one another, is utilized for directing a divergent beam of light on the polarizer 48.

To facilitate this interchange of parts, the optical device and the diffuser are each made slidable in a separate plane. Thus, the frame 60 holding the light diffuser may slide on the inclined partition 47, and the casing 58 holding the lenses 56 and 57 is provided with side flanges 62 (Fig. 11), which are adapted to slide in channel-shaped guides 64 secured to the side walls 42 of the casing 40. A pair of chains 65 are attached at one end to the frame 60 and at their other end to the frame 58, and cooperate with a pair of sprocket wheels 66 fixed to a shaft 67. The latter is journaled in suitable bearing supports 69, which may be conveniently secured to the inner surface of the top cover plate 44. The shaft 67 has one end projecting through one of the side walls 42, and to this end is attached a crank 70 by means of which it may be rotated. Thus, a rotation of the crank 70 in a clockwise direction will raise the light diffuser 59 out of the way and lower the lenses 56 and 57 into operative position (Fig. 10), and a counterclockwise movement of the handle 70 will raise the lenses and lower the light diffuser (Fig. 9). Suitable stops 71 and 72 are provided for limiting the downward movements of the light diffuser and of the lenses respectively.

A disc 74 (Fig. 12) is rotatably mounted on an inclined block 75 (Figs. 9 and 10) fixed to the front plate 49 of the casing 40, and into an opening formed through this disc 74 is fitted the tubular protective casing 73 to a Nicol prism 76 and a thin sheet of selenite and supporting glass plates therefor (77). The axis of rotation of the disc 74 is at an angle to the central ray (78 in Fig. 9 and 78′ in Fig. 10) of the beam reflected from the polarizer 48, and at one side of this axis there is an opening 79 formed through the plate 39 and the block 75 in alinement with said central ray 78 or 78′. This opening 79 is in registration with the disc opening when the disc is rotated into the position shown in Fig. 9. There is another opening 80 formed through the plate 49 and the block 75 at the other side of the axis of rotation, which opening is in registration with the disc opening when the disc is rotated 180 degrees from its position shown in Fig. 9 into the position shown in Fig. 10. In Fig. 9, the line of vision coincides with the center ray 78, and the prism 76 is so positioned in its casing 73 that its optic axis (not shown) is perpendicular or substantially perpendicular to the surface 48 at the point 78a thereof.

Thus, in Fig. 9, with the diffuser 59 properly interposed in the path of the rays from the lamp 52, such specimen as the transparent bulb 82 shown may be visually examined by means of such direct rays as 78 reflected from the polarizer 48. In Fig. 10, with the lenses 56 and 57 properly interposed in the path of the rays from the lamp 52, such specimen as the inside frosted bulb 81 shown may be visually examined by means of such indirect rays as 73 transmitted to the analyzer. It is noted that in both positions of the Nicol prism 76, its central principal plane coincides with the plane of the drawing, and that in both positions of the selenite, its principal planes are set at 45 degrees with the plane of the drawing, tests on either transparent or light-diffusing specimens being thus possible without any change in the position of either prism or selenite, except that produced by a rotation of the disc 74. All that is required for an interchange of test is a rotation of the crank 70 and a rotation of the disc 74.

Figs. 13 to 16 inclusive clearly demonstrate the marked improvement in the field of light brought about by my improved constructions of reflector and Nicol prism. The four fields illustrated therein are reproductions of actual photographs thereof, the particular combinations of reflector and prism utilized in producing said fields being shown, respectively, in simplified manner in the adjoining Figures 13a to 16a inclusive. Each photograph was taken on a panchromatic film with the tint-producing element or selenite crystal removed from the polariscope to obtain in the first instance a visual effect in black and white and therefore permit the camera to receive a true record of the dark and bright portions of the field obtained. Evidently, each photograph was taken with no specimen interposed between reflector and prism and with constant exposure. The usual diffuser was interposed between reflector and light source.

The fields 100 and 101 shown in Figs. 13 and 14 were both taken with the flat reflector 14 (Figs. 13a and 14a). However, for the field 100, the optic axis 20 of the prism 16 was oblique to the reflector 14, and for the field 101, the position of the optic axis 20 was nearly perpendicular to the reflector 14. The difference in the effects produced is striking. In Fig. 13, only the central rays were extinguished by the prism; whereas, in Fig. 14, extinction of rays extends in a narrow band laterally across the entire width of the field.

The cylindrical reflecting surface 1a (having a single curvature corresponding to a logarithmic spiral) was utilized for producing the fields 102 and 103 shown in Figs. 15 and 16. However, for the field 102, the prism 16 had its optic axis 20 oblique to the reflector 1a, and for the field 103, nearly perpendicular to the reflector 1a at the point from which the central ray proceeds. The difference in the effects produced is again striking. Only the rays in the central vertical portion of the field 102 were totally extinguished;

whereas total extinction occurred over the entire extent of the field 103.

Obviously, the above results tend to prove the correctness of the theory advanced herein.

It now becomes apparent that I have provided an improved form of reflecting surface which may be used in any type of optical device requiring a uniform beam of completely plane-polarized light to be transmitted to a point and which may be particularly advantageously utilized in connection with a Nicol prism as the analyzer of a polariscope, and also an improved form of Nicol prism which may be utilized in any light polarizing device, but particularly advantageously with my improved reflecting surface. It also becomes apparent that I have provided apparatus utilizing the improved reflecting surface, which apparatus may be used for detection of strain in either transparent glass or in glass having a light-diffusing film thereon.

It is understood that the embodiments of the invention described herein may be modified in various ways without departing from its spirit.

What is claimed is:

1. In a polariscope for making tests on radiation-transmitting material, the combination with a source of radiation, of a reflecting polarizer having a curvature with reference to a fixed point toward which rays from said source after reflection proceed for purpose of test on a specimen of such material interposed in their path, said curvature causing all of said rays to be reflected at a constant or substantially at a constant angle of reflection and the planes of reflection of said rays to contain or substantially contain a common line passing through said point.

2. In a polariscope for making tests on radiation-transmitting material, the combination with a source of radiation, of a reflecting polarizer the reflecting surface of which has a curvature with reference to a fixed point toward which rays from said source after reflection from said surface proceed for purpose of test on a specimen of such material interposed in their path, said curvature causing all of said rays to be reflected at the polarizing angle or substantially at the polarizing angle of said surface and the planes of reflection of said rays to contain or substantially contain a common line passing through said point.

3. In a polariscope for making tests on radiation-transmitting material, the combination with a source of radiation, of a reflecting polarizer curving in transverse directions, the curvature causing all rays from said source, proceeding after reflection toward a predetermined point for purpose of test on a specimen of such material interposed in their path, to leave said polarizer at a constant angle of reflection and the planes of reflection of said rays to intersect at a common line passing through said point.

4. In a polariscope for making tests on radiation-transmitting material, the combination with a source of radiation, of a reflecting polarizer having a double curvature causing all rays from said source, proceeding after reflection toward a fixed point for purpose of test on a specimen of such material interposed in their path, to leave said polarizer at its polarizing angle and the planes of reflection of said rays to contain a common line passing through said point.

5. In a polariscope for making tests on radiation-transmitting material, the combination with a source of radiation, of a reflecting polarizer the reflecting surface of which has a single curvature in parallel planes causing all rays from said source, forming part of a beam of predetermined width incident to said surface and proceeding after reflection from said surface toward a predetermined point for purpose of test on a specimen of such material interposed in their path, to leave said polarizer substantially at a constant angle of reflection and the planes of reflection of said rays to substantially contain the line passing through said point perpendicularly to the plane tangent to said surface at the point from which the central ray of said reflected rays proceeds.

6. In a polariscope for making tests on radiation-transmitting material, the combination with a source of radiation, of a reflecting polarizer the reflecting surface of which has a single curvature in parallel planes causing all rays from said source, forming part of a beam of predetermined width incident to said surface and proceeding after reflection from said surface toward a fixed point for purpose of test on a specimen of such material interposed in their path, to leave said polarizer substantially at its polarizing angle and the planes of reflection of said rays to substantially contain the line passing through said point perpendicularly to the plane tangent to said surface at the point from which the central ray of said reflected rays proceeds.

7. In a polariscope for making tests on light-transmitting material, the combination with a source of radiation, of a polarizer for reflecting rays from said source toward a fixed point for purpose of test on a specimen of such material interposed in their path, the reflecting surface of said polarizer having a linear curve in a plane of reflection containing said point determined by the following equation:

$$\log_e \frac{\rho}{\rho_0} = \theta \tan \alpha,$$

in which $\alpha$ and $\rho_0$ are constants and are respectively the polarizing angle of the polarizer and the predetermined length of a predetermined reflected ray proceeding in said plane toward said point, and $\theta$ and $\rho$ are mutual variables corresponding values of either one of which are obtained by assigning values to the other, and are respectively the angle in radians between said predetermined ray and any reflected ray proceeding in said plane toward said point and the corresponding length of said any ray, $\theta$ being positive on one side of said predetermined ray and negative on the other, said reflecting surface having the same linear curve in planes parallel to said plane.

8. In a polariscope for making tests on radiation-transmitting material, the combination with a source of radiation, of a polarizer for reflecting rays from said source toward a fixed point for purpose of test on a specimen of such material interposed in their path, the reflecting surface of said polarizer having a linear curve in a plane of reflection containing said point determined by the following equation:

$$\log_e \frac{\rho}{\rho_0} = \theta \tan \alpha,$$

in which $\alpha$ and $\rho_0$ are constants and respectively the polarizing angle of the polarizer and the predetermined length of a predetermined reflected ray proceeding in said plane toward said point, and $\theta$ and $\rho$ are mutual variables corresponding values of either one of which are obtained by assigning values to the other and are respectively the angle in radians between said predetermined ray and any reflected ray proceeding in said plane toward said point and the corresponding length of said any reflected ray, $\theta$ being positive on one side of said predetermined ray and negative on the other, said reflecting surface being a surface of revolution of said linear curve about an axis contained in said plane and passing through said point.

9. In a polariscope for making tests on radiation-transmitting material, the combination with a source of radiation, of a polarizer for reflecting rays from said source toward a fixed point for purpose of test on a specimen of such material interposed in their path, the reflecting surface of said polarizer having a curvature with reference to said point to cause said rays to leave the polarizer substantially at a constant angle of reflection and the planes of reflection of said rays to substantially contain the line passing through said point making an angle with the central ray of said reflected rays equal to said angle of reflection.

10. In a polariscope for making tests on radiation-transmitting material, the combination with a source of radiation, of a polarizer for reflecting rays from said source toward a fixed point for purpose of test on a specimen of such material interposed in their path, the reflecting surface of said polarizer having a curvature with reference to said point to cause said rays to leave the polarizer substantially at its polarizing angle and the planes of reflection of said rays to substantially contain the line passing through said point parallel to the normal to said surface at the point from which the central ray of said reflected rays proceeds.

11. In a polariscope for making tests on radiation-transmitting material, the combination with a source of radiation, and a polarizer for reflecting rays from said source for purpose of test on a specimen of such material interposed in their path, said reflected rays converging toward a point and their planes of reflection containing or substantially containing a common line, of a Nicol prism in the path of said reflected rays between said specimen and said point, said prism having its parts constructed to cause its optic axis to be contained or substantially contained in said line.

12. In a polariscope for making tests on radiation-transmitting material, the combination with a source of radiation, of a polarizer for reflecting rays from said source toward a fixed point for purpose of test on a specimen of such material interposed in their path, the reflecting surface of said polarizer having a curvature to cause said reflected rays to possess a constant or substantially constant angle of reflection and their planes of reflection to contain or substantially contain a common line, and a Nicol prism in the path of said reflected rays between said specimen and said point, said prism being constructed to cause its optic axis to be contained or substantially contained in said line.

13. In a polariscope for making tests on radiation-transmitting material, the combination with a source of radiation, of a polarizer for reflecting rays from said source toward a fixed point for purpose of test on a specimen of such material interposed in their path, the reflecting surface of said polarizer having a single curvature in parallel planes to cause said reflected rays to leave the polarizer substantially at a constant angle of reflection and the planes of reflection of said reflected rays to substantially contain the line passing through said point at an angle with the central ray of said reflected rays equal to said angle of reflection, and a Nicol prism having its parts constructed to cause its optic axis to be inclined with reference to its visual axis at an angle equal or substantially equal to said angle of reflection, said prism being disposed in the path of said reflected rays between said specimen and said point with its optic axis contained or substantially contained in said line.

14. In a polariscope for making tests on radiation-transmitting material, the combination with a source of radiation, of a polarizer for reflecting rays from said source toward a fixed point for purpose of test on a specimen of such material interposed in their path, the reflecting surface of said polarizer curving in transverse directions to cause said reflected rays to leave the polarizer at a constant angle of reflection and their planes of reflection to intersect at a predetermined line, and a Nicol prism in the path of said reflected rays between said specimen and said point, said prism having its parts constructed to cause its optic axis to be contained or substantially contained in said line.

15. In a polariscope for making tests on radiation-transmitting material, the combination with a source of radiation of a polarizer for reflecting rays from said source toward a point for purpose of test on a specimen of such material interposed in their path, the reflecting surface of said polarizer having a linear curve in a plane of reflection containing said point determined by the following equation:

$$\log_e \frac{\rho}{\rho_0} = \theta \tan \alpha,$$

in which $\alpha$ and $\rho_0$ are constants and are respectively the polarizing angle of the polarizer and the predetermined length of a predetermined reflected ray proceeding in said plane toward said point, and $\theta$ and $\rho$ are mutual variables corresponding values of either one of which are obtained by assigning values to the other and are respectively the angle in radians between said predetermined ray and any reflected ray proceeding in said plane toward said point and the corresponding length of said any ray, $\theta$ being positive on one side of said predetermined ray and negative on the other, said reflecting surface having the same linear curve in planes parallel to said plane of reflection, and a Nicol prism positioned between said specimen and said point with its visual axis coinciding or substantially coinciding with one of the reflected rays proceeding toward said point, the planes of reflection of the reflected rays proceeding toward said point substantially containing the line passing through said point making an angle with said visual axis equal to said polarizing angle, said prism having its parts constructed to cause its optic axis to be contained or substantially contained in said line.

16. In a polariscope for making tests on radiation-transmitting material, the combination with a source of radiation, of a polarizer for reflecting rays from said source toward a point for purpose of test on a specimen of such material interposed in their path, the reflecting surface of said polarizer having a linear curve in a plane of reflection containing said point determined by the following equation:

$$\log_e \frac{\rho}{\rho_0} = \theta \tan \alpha,$$

in which $\rho_0$ and $\alpha$ are constants and are respectively the predetermined length of a predetermined ray proceeding in said plane toward said point and the polarizing angle of the polarizer, and $\rho$ and $\theta$ are mutual variables corresponding values of either one of which are obtained by assigning values to the other and are respectively the length of any reflected ray proceeding in said plane toward said point and its angle in radians with said predetermined ray, $\theta$ being positive on one side of said predetermined ray and negative on the other, said reflecting surface being a surface of revolution of said linear curve about an axis containing said point and contained in said plane, and a Nicol prism positioned between said specimen and said point with its visual axis coinciding or substantially coinciding with one of the reflected rays proceeding toward said point, said prism having its parts constructed to cause its optic axis to be contained or substantially contained in said axis of revolution.

17. An apparatus for detecting strain in either transparent radiation-transmitting material or radiation-transmitting material having a light-diffusing film, comprising a source of light, a curved reflecting polarizer, optical means for directing a divergent beam of symmetrically distributed non-diffused rays from said source to said polarizer, a diffuser for producing a uniformly illuminated secondary source of light, means for positioning said diffuser in and out of the path of the rays impinging on said polarizer for tests on specimens of transparent radiation-transmitting material and specimens of radiation-transmitting material having a light-diffusing film respectively, the curvature of said polarizer causing the rays from said diffuser proceeding after reflection toward a point to be reflected at a constant angle or substantially at a constant angle and their planes of reflection to contain or substantially contain a common line passing through said point when said diffuser is in its operative position and causing the rays of said divergent beam to be also reflected at a constant angle or substantially at a constant angle when said diffuser is out of its operative position, specimens of transparent radiation-transmitting material being disposed in the path of said point-proceeding rays and specimens of radiation-transmitting material having a light-diffusing film being disposed in the path of said beam after reflection, a Nicol prism for viewing specimens of either of such materials, and means for positioning said prism in and out of alinement with the path of the plane-polarized rays from said polarizer for tests on specimens of transparent radiation-transmitting material and specimens of radiation-transmitting material having a light-diffusing film respectively, said prism when in either of said positions having its optic axis contained in the central plane of reflection of the plane-polarized rays from said polarizer, said prism having its parts constructed to cause its optic axis to be contained or substantially contained in said line when in its position of test on specimens of transparent radiation-transmitting material.

18. An apparatus for detecting strains in either transparent radiation-transmitting material or radiation-transmitting material having a light-diffusing film, comprising a source of light, a curved polarizer for plane-polarizing rays from said source by reflection, an optical device and a diffuser movable in separate planes transverse to the path of rays to said polarizer, means for simultaneously moving said device and diffuser whereby either one is disposed in the path of rays to said polarizer while the other is removed from said path, said optical device serving to direct a divergent beam of symmetrically distributed non-diffused rays to said polarizer when testing specimens of radiation-transmitting material having a light-diffusing film and said diffuser serving to produce a uniformly illuminated secondary source of light when testing specimens of transparent radiation-transmitting material, the curvature of said polarizer causing the rays from said diffuser proceeding after reflection toward a point to be reflected at the polarizing angle or substantially at the polarizing angle and their planes of reflection to contain or substantially contain a common line passing through said point when said diffuser is in its operative position and causing the rays of said divergent beam to be also reflected at the polarizing angle or substantially at the polarizing angle when said device is in its operative position, a Nicol prism for viewing specimens of either of such materials positioned in the path of plane-polarized rays from said polarizer, and means for positioning said prism in and out of alinement with the path of the plane-polarized rays from said polarizer for tests on specimens of transparent radiation-transmitting material and specimens of radiation-transmitting material having a light-diffusing film, said prism when in either of said positions having its optic axis contained in the central plane of reflection of the plane-polarized rays from said polarizer, said prism having its parts constructed to cause its optic axis to be contained or substantially contained in said line when in its position of test on specimens of transparent radiation-transmitting material.

SAMUEL M. GRAY.